United States Patent
Ogunwumi

(10) Patent No.: US 6,620,751 B1
(45) Date of Patent: Sep. 16, 2003

(54) STRONTIUM FELDSPAR ALUMINUM TITANATE FOR HIGH TEMPERATURE APPLICATIONS

(75) Inventor: Steven B. Ogunwumi, Painted Post, NY (US)

(73) Assignee: Corning Incorporated, Corning, NY (US)

(*) Notice: Subject to any disclaimer, the term of this patent is extended or adjusted under 35 U.S.C. 154(b) by 14 days.

(21) Appl. No.: 10/098,711

(22) Filed: Mar. 14, 2002

(51) Int. Cl.$^7$ .................. C04B 39/462; C04B 35/195
(52) U.S. Cl. .............. 501/134; 501/80; 501/128; 55/523; 55/DIG. 30
(58) Field of Search ................. 501/134, 143, 501/80, 128; 55/523, DIG. 30

(56) References Cited

U.S. PATENT DOCUMENTS 6,101,793 A * 8/2000 Nagai et al. .................. 55/523
6,210,645 B1 * 4/2001 Kumazawa et al. ......... 422/206
2003/0015829 A1 * 1/2003 Fukuda et al.

FOREIGN PATENT DOCUMENTS

JP 2-229763 9/1990

OTHER PUBLICATIONS

Takahashi et al., "Preparation, structure and properties of thermally and mechanically improved aluminum titanate ceramics doped with alkai feldspar", To be submitted to J. Amer. Ceram. Soc., pp. 1–29.

Fukuda et al., "Modified Tialite Ceramics for High Temperature Use", pp. 1–19.

* cited by examiner

Primary Examiner—Karl Group
(74) Attorney, Agent, or Firm—Anca C. Gheorghiu

(57) ABSTRACT

A structure for use in high temperature applications and including a porous ceramic material consisting essentially of about 50–90 percent by weight iron or magnesium stabilized aluminum titanate ($AlTiO_5$) and about 10–50 percent by weight strontium feldspar ($SrO.Al_2O_3.2SiO_2$), and having a coefficient of thermal expansion over a temperature range from room temperature to 1000° C. of about $-10\times10^{-7}$/° C. to $+15\times10^{-7}$/° C., a heat capacity at 500° C. greater than 3.2 J/cm$^3$K, a porosity of about 15–50 percent by volume, preferably 40–50 percent by volume, and a median pore size of about 5–50 micrometers, preferably 8–15 micrometers. The structure is especially useful as a diesel exhaust particulate filter.

20 Claims, 3 Drawing Sheets

Porosity

AT

SAS

US 6,620,751 B1

STRONTIUM FELDSPAR ALUMINUM TITANATE FOR HIGH TEMPERATURE APPLICATIONS

BACKGROUND OF THE INVENTION

The instant invention relates to strontium feldspar aluminum titanate ceramics. Specifically the invention relates to strontium feldspar aluminum titanate ceramics having a low thermal expansion and high thermal shock resistance, suitable porosity and a narrow pore size distribution for diesel exhaust filtration applications.

In the industry cordierite ($2MgO.2Al_2O_3.5SiO_2$) has been the cost-effective material of choice for high temperature filtering applications, such as flow-through and wall-flow filters, due to its combination of good thermal shock resistance, filtration efficiency, and durability under most operating conditions. However, under certain circumstances cordierite filters are susceptible to damage and have even catastrophically failed. Occasional thermal runaway occurs during uncontrolled regenerations resulting in localized cordierite melting. Another factor contributing to failure occurs when metal impurities from the engine oil, catalytic additives or corroded metal from the exhaust port liners are introduced into the filter during operation. Typically, at temperatures exceeding 1300° C., these metals form oxides which react with the cordierite structure. Evidence of the failed material are usually small holes on the filter where the metal initially deposits and reacts causing corrosion and melting of the material.

Recently, silicon carbide (SiC) has been used as an alternative to cordierite in the fabrication of diesel particulate filters. However, SiC is costly and must be segmented due to an inherent high coefficient of thermal expansion (CTE) and poor thermal shock resistance.

A need therefore exists for a ceramic suitable for high temperature applications without the shortfalls of cordierite, but with all its advantages. The present invention provides such a ceramic.

SUMMARY OF INVENTION

The instant invention is founded upon the discovery of a strontium feldspar aluminum titanate low expansion, high thermal shock resistant ceramic, hereafter referred to as SAT. The inventive ceramic comprises a strontium feldspar ($SrO.Al_2O_3.2SiO_2$) (SAS) phase and an aluminum titanate ($Al_2TiO_5$) (AT) second phase, and is extrudable into honeycomb structures. Iron (Fe) or magnesium (Mg) substitution within the AT phase is found to improve the stability of the ceramic against decomposition, especially at high temperatures above 800° C. In the present invention, isormorphic substitution of Fe and Mg for aluminum within the AT is limited to a range between about 0–60 mole percent (%), preferably 1–10 mole %.

Inventive structure has a formulation which consists essentially, by weight, of between about 50–90% Fe or Mg stabilized AT and between about 10–50% SAS. Advantages include low coefficient of thermal expansion, high thermal shock resistance, high volumetric heat capacity, high interconnected porosity and large median pore size.

Accordingly, the coefficient of thermal expansion (CTE) from room temperature (RT) to 1000° C. is about $-10 \times 10^{-7}/°$ C. to $+15 \times 10^{-7}/°$ C., preferably from room temperature to 800° C. of about $-0.5 \times 10^{-7}/°$ C. to $+6 \times 10^{-7}/°$ C. The voltmeter heat capacity is greater than $3.2$ J $cm^{-3}K^{-1}$ as measured at 500° C. The total porosity is about 15–50% by volume, preferably about 40–50% by volume, and, the median pore size is about 5–50 micrometers, preferably about 8–15 micrometers.

Preferably the inventive ceramic consists essentially of about 70–80% by weight Fe stabilized AT and about 20–30% by weight SAS, and has a coefficient of thermal expansion over a temperature range from room temperature to 800° C. of about $-0.3 \times 10^{-7}/°$ C. to $+2 \times 10^{-7}/°$ C., a porosity of about 40–45% by volume, and a median pore size of about 15–20 micrometers.

The inventive ceramic is suitable in high temperature applications such as wall-flow filters for diesel exhaust filtration, and automotive catalytic converters.

Wall-flow filters comprising the inventive structure exhibit high volumetric heat capacity, and low pressure drop across the length of the. The inventive ceramic is preferably extruded into a honeycomb structure having an inlet end and an outlet end and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

DETAILED DESCRIPTION OF INVENTION

Figure 1A:
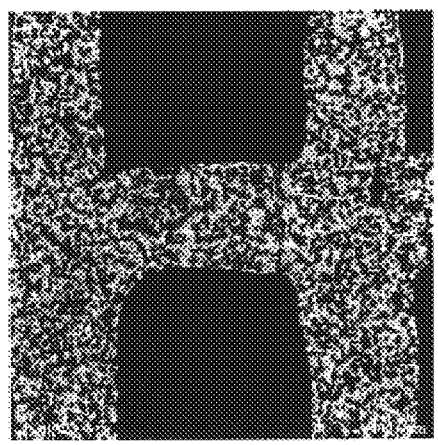
FIGS. 1A–B are scanning electron micrographs of Example 5 of the present invention.
Figure 1B:
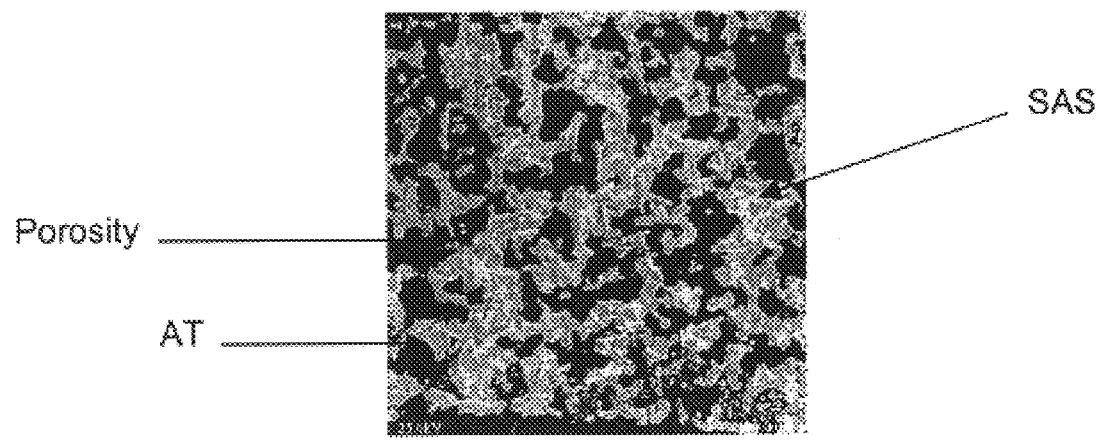
Figure 2A:
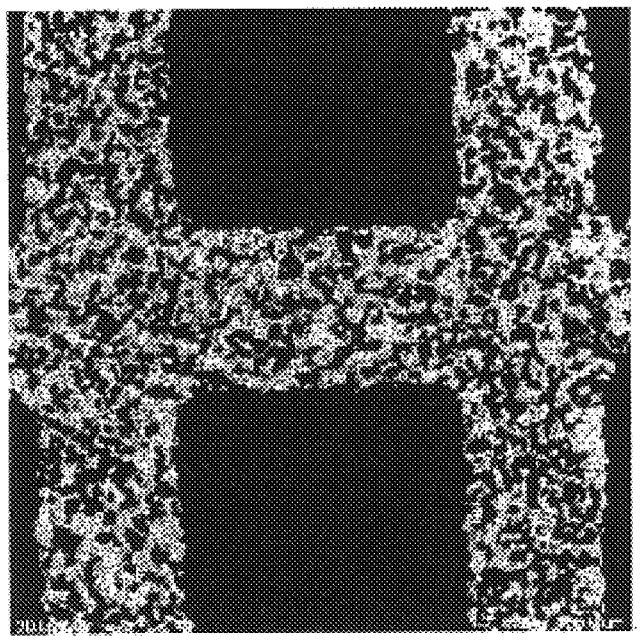
FIGS. 2A–B are scanning electron micrographs of Example 6 of the present invention.
Figure 2B:
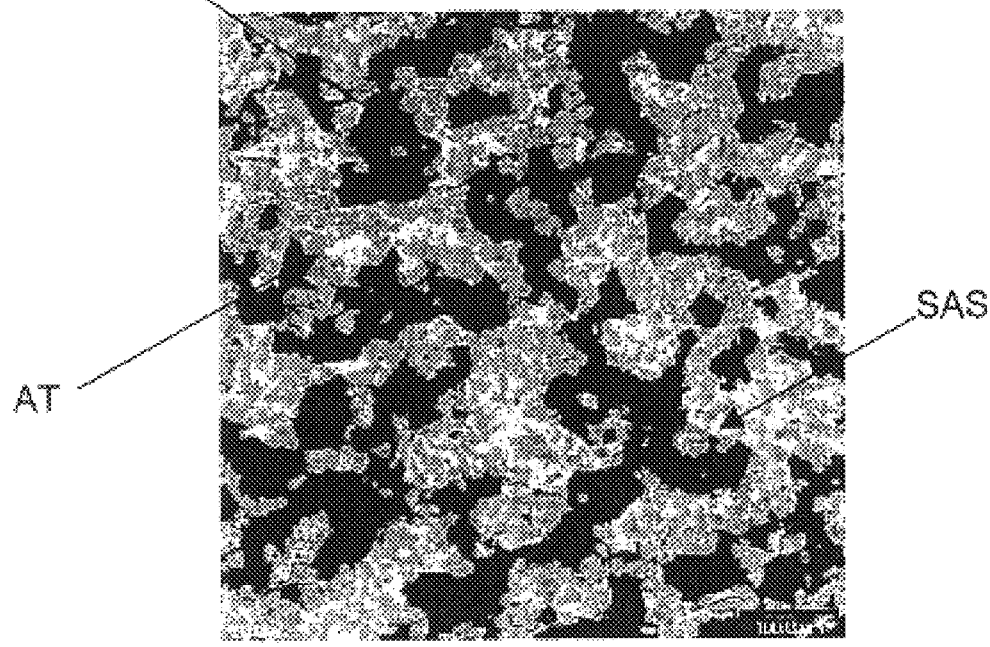

The invention is a ceramic which is largely biphasic, having a predominant first phase of magnesium (Mg) or iron (Fe) stabilized aluminum titanate ($Al_2TiO_5$) (AT), and a second phase of strontium feldspar ($SrO.Al_2O_3.2SiO_2$) (SAS). Minor phases may also be present, these including alumina ($Al_2O_3$) and titania ($TiO_2$). This unique phase combination renders the inventive structure, highly refractory with a near-zero CTE, thus making it suitable for high temperature applications such as filtration of diesel exhaust particulate matter.

AT has a high melting point of 1860° C., and a highly anisotropic thermal expansion (i.e., widely differing expansions along the crystallographic axes) of about $-26 \times 10^{-7}/°$ C. along the a-axis, about $118 \times 10^{-7}/°$ C. along the b-axis, and about $194 \times 10^{-7}/°$ C. along the c-axis. The extreme anisotropy causes the formation of internal stress within large AT grains. This results in severe microcracking as the material cools which is attributed to its low coefficient of thermal expansion. AT exhibits a bulk CTE ranging from about $-3$ to $+9.7 \times 10^{-7}/°$ C. depending on the grain size or degree of microcracking. Larger grain growth and subsequent microcracking, however, produce a low strength material. The addition of SAS as a second phase, serves to increase the strength (MOR) and balance the CTE. The resulting composite AT-SAS ceramic structure exhibits microcracking and a near-zero CTE, leading to high thermal shock resistance. Microcracked bodies tend to bias the CTE towards the most negative CTE component because the opening of microcracks on cooling accommodates the normal positive components. Accordingly, in the inventive SAT structures the CTE, as measured by dilatometry over a temperature range from room temperature (RT) to 1000° C., is about $-10\times10^{-7}/°$ C. to $+15\times10^{-7}/°$ C., preferably the CTE from RT to 800° C. is about $-0.5\times10^{-7}/°$ C. to $+5\times10^{-7}/°$ C.

The AT structure demonstrates a structural instability between 800° and 1300° C. Isomorphic substitution of Fe or Mg is desired to enhance the stability of AT against decomposition above 800° C. In the present invention isormorphic substitution of Fe and Mg for the aluminum within the AT phase is limited to a range between about 0–60 mole %, preferably about 1–10 mole %. The composition of the inventive SAT ceramic consists essentially, by weight, of about 50–90% Fe or Mg stabilized AT and between about 10–50% SAS. Preferably, the composition consists essentially of about 70–80% Fe or Mg stabilized AT and about 20–30% SAS.

The inventive SAT ceramic has high interconnected porosity and large median pore size, making it suitable for high temperature filtration applications, such as wall-flow filters. Accordingly, the total porosity, as measured by mercury porosimetry is about 15–50%, preferably about 40–50%. The pore size distribution is uniform with a median pore size of 5–50 micrometers, preferably 8–15 micrometers. An additional advantage is high heat capacity. High heat capacity is desirable because it reduces the magnitude of the temperature increase in the filter applications during regeneration. The heat capacity as measured at 500° C. is greater than 3.2 J cm$^{-3}$K$^{-1}$, and preferably between 3.7–3.7 J cm$^{-3}$K$^{-1}$.

A suitable method of making the ceramic according to the present invention, is by forming a mixture of particulate raw materials, and optionally pore formers, along with organic binders, lubricants, plasticizers, and/or solvent, into a green body, optionally drying, and then firing to form the product structure.

The SAT-forming raw materials are (1) oxide sources that react to form the SAS and Mg or Fe stabilized AT phases, and/or (2) partially or completely pre-reacted SAS and Mg or Fe stabilized AT powders. Advantageous raw materials include silica, alumina, strontium carbonate, titania, iron oxide and/or a magnesium carbonate. Optionally, a pore former may be included to obtain a larger porosity and/or coarser median pore diameter in the final product structure. Raw materials are blended together with organic constituents that may include plasticizers, lubricants, binders, and solvents. Water may also optionally be added as a solvent. The mixture is shaped into a green body, optionally dried, and then fired at a temperature and for a time sufficient to form the final product structure.

All starting raw materials are chosen to limit the presence of alkali in the composition. The alumina source is a powder which, when heated to a sufficiently high temperature in the absence of other raw materials, yield substantially pure aluminum oxide, and includes alpha-alumina, a transition alumina such as gamma-alumina or rho-alumina, boehmite, aluminum hydroxide, and mixtures thereof. The morphology of the alumina has to be tabular and particle size has to be sufficiently large for microcracking to be induced in the final structure, but small enough for good extrusion to occur. Accordingly, a particle size of between about 10–25 micrometers is suitable.

The silica source includes clay and quartz, but is preferably quartz which has a higher sintering temperature than a clay source. The use of quartz instead of clay contributes to the formation of porosity in the final structure at elevated temperatures. Hematite is recommended as the source of the iron oxide. Rutile, preferably Kronos 3020 rutile, available commercially from Kronos, Inc. of Cranbury, N.J. having a particle size of about 7–15 micrometers is the preferred source for titania. The reaction to form aluminum titanate occurs when $Al^{3+}$ ions is diffuse into titanium dioxide ($TiO_2$) or titania. The mechanism has also been confirmed experimentally. The size of the $TiO_2$ source is important to avoid entrapment of unreacted oxide by the rapidly growing nuclei of the product. Unreacted oxides lead to considerable higher thermal expansion in the final sintered body.

A pore former is not necessary to attain the desired properties and optimum particle distribution, but could be added to improve the porosity if desired. The recommended pore former is cornstarch. The amount of pore former in the case of cornstarch is to be at most 20% by weight of the raw material mixture. If graphite is used, at most 30% by weight of the raw material mixture is necessary. Methyl cellulose is used an organic binder which is later burned-off during firing. Oleic acid is preferably used as a dispersant. Sodium stearate is not recommended due to contamination from the sodium. Diglycol stearate may be used but typically leads to poor knitting during extrusion, resulting in crack formation during firing. If diglycol stearate is used, addition of approximately 1–2% polyethylene glycol is required to serve as a lubricant, improving extrusion.

The inventive ceramic is particularly suitable for high temperature filtration applications. In particular the inventive ceramic is particularly suitable for diesel particulate filter applications. For such applications the raw material mixture is preferably shaped by extrusion into a honeycomb multicellular structure, as known in the art. The resulting shaped green honeycomb bodies are usually dried and then heated to a maximum temperature of about 1485–1500° C. over a period of about 30–50 hours, and held at the maximum temperature for about 8–14 hours.

While the construction of the filter can have any shape or geometry suitable for a particular application, it is preferred that it be multicellular structures such as a honeycomb structures. The honeycomb structure has an inlet and outlet end or face, and a multiplicity of cells extending from the inlet end to the outlet end, the cells having porous walls. The inventive filters have cellular densities from about 100 cells/in$^2$ (15.5 cells/cm$^2$) to about 400 cells/in$^2$ (62 cells/cm$^2$).

To obtain a wall-flow filter, a portion of the cells of the honeycomb at the inlet end or face are plugged, as known in the art. The plugging is only at the ends of the cells which is typically to a depth of about 5 to 20 mm, although this can vary. A portion of the cells on the outlet end but not corresponding to those on the inlet end are plugged. Therefore, each cell is plugged only at one end. The preferred arrangement is to have every other cell on a given face plugged as in a checkered pattern.

Wall-flow diesel exhaust particulate filters comprising exhibiting a low pressure drop across the length of the filter and low back pressure against the engine comparable to commercially available SiC counterparts have been made in present invention. The pressure drop across the filter is a function of the accumulation of the carbonaceous soot on the walls of the diesel particulate filter. As the amount of soot accumulated increases, it creates a progressive increase in the resistance to flow of the exhaust gas through the walls of the filter and carbon soot layer. This resistance to flow is manifested as a pressure drop that can be measured across the length of the filter, and results in an increased back pressure against the engine.

Another advantage is decreased reaction with metal oxide "ash" particles that are carried by exhaust gas in automobile engines. Metal oxide "ash" particles are not combustible and, therefore, are not removed during regeneration. A problem which exists in the industry is that if temperatures during the regeneration process reach sufficiently high values, the ash may sinter to the filter material or even react with the filter material resulting in partial melting. Experiments have shown that the presence of the AT phase increased ash resistance in filters bodies comprising the inventive ceramic. Further, the inventive ceramic has a high heat capacity which reduces the magnitude of the temperature increase in the filter during regeneration. Lower temperatures in the filter during regeneration result in less sintering of the metal oxide ash, and less reaction of the ash with the filter, thus increasing the lifetime of the filter Although the preferred application is for diesel particulate filters, it is to be noted that the inventive ceramic is equally suitable as automotive flow-through substrates.

EXAMPLES

To more fully illustrate the invention, the following non-limiting examples of extruded honeycombs are presented in Tables I and II. Table I reports examples of compositions and the resulting phase assemblages according to the present invention. Table II reports physical properties as measured on the inventive samples. All parts, portions and percentages are on a basis of total raw materials weight unless otherwise stated.

The oleic acid as the dispersant was mixed with the silica for approximately 10–15 minutes prior to addition of the remaining dry raw materials and organic components. The resulting mixture continued to be mixed to provide homogenization. Deionized water was then gradually added in a quantity sufficient to impart plasticity to the mixture in a muller. After kneading, the combined ingredients are extruded through a die into honeycomb bodies having approximately 100 to 200 cells per square inch and having a wall thickness of about 0.010 to 0.025 inch. The bodies thus formed are cut to desired lengths and heated in an oven at 85° C. until dried.

The samples are fired in an electric furnace at rates ranging from 20–40° C./hr over various temperature intervals to a maximum temperature of 1485–1500° C. for a period of 30–50 hours, with a hold at the maximum temperature for about 8–14 hours to develop the final product structure, and cooled by shutting off power to the furnace.

Table II reports physical properties as determined on the examples. Phase assemblage was identified by powder x-ray diffractometry. Porosities and pore sizes of selected samples were characterized by mercury porosimetry. Total porosity is reported in volume percent and pore sizes in micrometers. Mean coefficients of thermal expansion from room temperature (RT) to 800° C. and 1000° C. were measured using a dilatometer and are reported in $10^{-7}/°$ C.

The coefficient of thermal expansion (CTE) from room temperature to 1000° C. is about $-10 \times 10^{-7}/°$ C. to $+6 \times 10^{-7}/°$ C., preferably from RT to 800° C. of about $-0.5 \times 10^{-7}/°$ C. to $+3 \times 10^{-7}/°$ C. Referring now to FIGS. 1A–B and 2A–B therein illustrated is the microstructure of Examples 5 and 6 respectively, as observed via Scanning Electron Microscopy.

Figure 3:
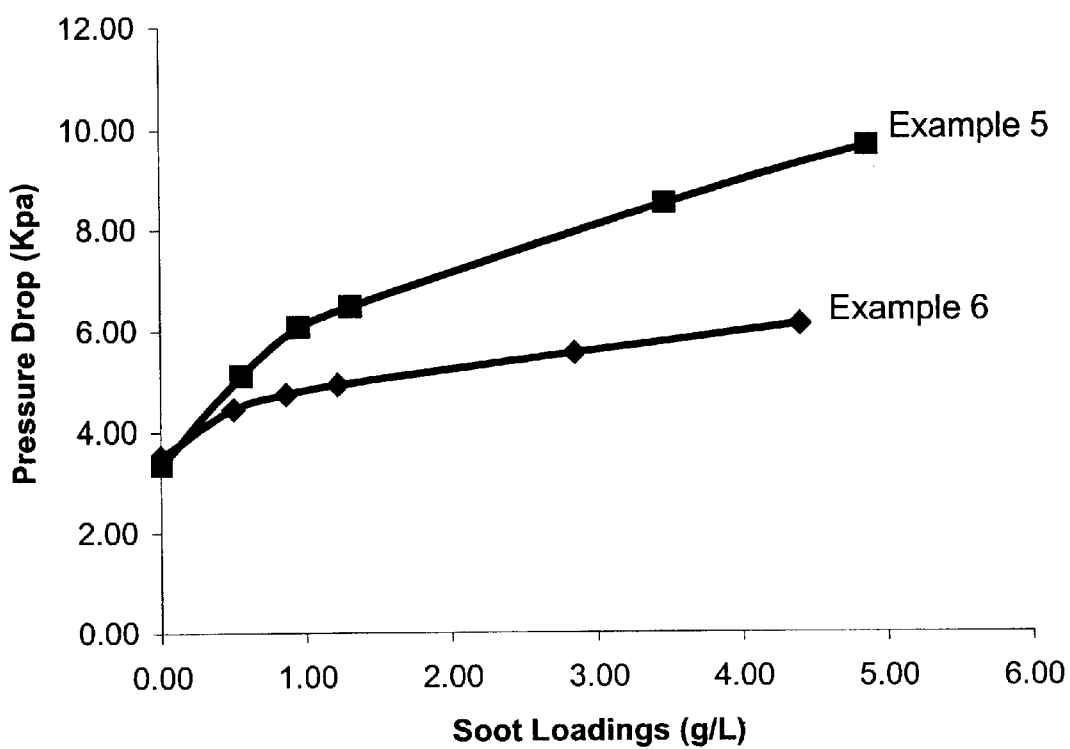
FIG. 3 demonstrates that low pressure drops across the length of a filter can be achieved with wall-flow filters comprising the SAT ceramic of the present invention; examples 5 and 6 are illustrated for a gas flow rate of 26.25 scfm.

The porosity distribution is substantially uniform and generally between about 15–50%, preferably about 40–50%, with a well connected pore structure. The mean pore size is generally between of about 5–50 micrometers, preferably about 8–15 micrometers. These properties of the inventive structure lead to a low back pressure in experimental tests as shown in FIG. 3. Therein illustrated is the pressure drop in KPa as a function of soot loading in g/L and a 26.25 scfm (standard cubic feet per minute) flow rate for Examples 5 and 6.

At the present time.the most preferred combination of AT and SAS appears to be 80% by weight Fe stabilized AT and 20% by weight SAS, with a coefficient of thermal expansion over a temperature range from room temperature to 800° C. of about $-0.3 \times 10^{-7}/°$ C. to $+2 \times 10^{-7}/°$ C., a porosity of about 40–45% by volume, and median pore size of about 15–20 micrometers, as illustrated in Examples 5 and 6.

It should be understood that while the present invention has been described in detail with respect to certain illustrative and specific embodiments thereof, it should not be considered limited to such but may be used in other ways without departing from the spirit of the invention and the scope of the appended claims.

TABLE I

Chemical compositions of samples.

| Example Number | 1 | 2 | 3 | 4 | 5 | 6 |
|---|---|---|---|---|---|---|
| Raw Material or Pore Former | | | | | | |
| Silica | 11.38 | 6.5 | 5.4 | 5.4 | 6.5 | 6.5 |
| Alumina 1 | 9.69 | 5.54 | 4.6 | 4.6 | — | 5.54 |
| Alumina 2 | — | — | — | 36.22 | 49.01 | 43.47 |
| Alumina 3 | 35.32 | 43.47 | 36.22 | — | — | — |
| Strontium Carbonate | 13.39 | 7.96 | 6.6 | 6.6 | 7.96 | 7.96 |
| Iron Oxide | 1.63 | 2.0 | 1.7 | 1.7 | 2.0 | 2.0 |
| Titania | 28.05 | 34.35 | 28.76 | 28.76 | 34.53 | 34.35 |
| Cornstarch | — | — | 16.67 | — | — | — |
| Graphite | — | — | — | 16.67 | — | — |
| Binder, Lubricant, and Solvent | | | | | | |
| Methyl Cellulose | 4.5 | 4.5 | 4.5 | 4.5 | 4.5 | 4.5 |
| Oleic Acid | 0.5 | 0.5 | 0.5 | 0.5 | 0.5 | 0.5 |
| Polyethylene Glycol | 1.0 | 1.0 | 1.0 | 1.0 | — | — |
| Water | 21.4 | 21.4 | 28.5 | 27.5 | 20.0 | 19.0 |
| Firing Conditions | | | | | | |
| Furnace Type | electric | electric | electric | electric | electric | electric |
| Maximum Temperature (° C.) | 1500 | 1485 | 1485 | 1485 | 1485 | 1485 |
| Hold Time (hours) | 8 | 8 | 8 | 8 | 8 | 8 |

TABLE II

Properties of samples.

| Example Number | 1 | 2 | 3 | 4 | 5 | 6 |
|---|---|---|---|---|---|---|
| Phase Assemblage | | | | | | |
| Fe stabilized AT (wt. %) | 65 | 80 | 80 | 80 | 80 | 80 |
| Fe mole % | 3 | 3 | 2.2 | 2.2 | 3 | 3 |
| SAS (wt. %) | 35 | 20 | 20 | 20 | 20 | 20 |

TABLE II-continued

Properties of samples.

| Example Number | 1 | 2 | 3 | 4 | 5 | 6 |
|---|---|---|---|---|---|---|
| Properties | | | | | | |
| Mean CTE (RT-800° C.) ($10^{-7}$/° C.) | −4.8 | −0.9 | 3.5 | −4.0 | 2.0 | −0.3 |
| Mean CTE (RT-1000° C.) ($10^{-7}$/° C.) | 4.0 | 8.0 | 12.0 | 2.0 | 13.0 | 6.0 |
| Median Pore Size (micrometers) | 29 | 26 | 15 | 12 | 15 | 17 |
| Total Porosity (% vol.) | 34 | 34 | 40 | 25 | 41 | 44 |

What is claimed:

1. A structure comprising a porous ceramic material consisting essentially of about 50–90 percent by weight aluminum titanate ($AlTiO_5$) and about 10–50 percent by weight strontium feldspar ($SrO.Al_2O_3.2SiO_2$), wherein the aluminum titanate is stabilized by iron (Fe) or magnesium (Mg), the substitution of iron or magnesium into the aluminum titanate phase being at 0–60 mole %; and, wherein the structure has a coefficient of thermal expansion over a temperature range from room temperature to 1000° C. of about −10×$10^{-7}$/° C. to +15×$10^{-7}$/° C., a heat capacity at 500° C. of greater than 3.2 J/cm$^3$K, a porosity of about 15–50 percent by volume, and a uniform pore size distribution with a median pore size of about 5–50 micrometers.

2. The structure of claim 1 wherein iron or magnesium is substituted into aluminum titanate in a range of about 1–10 mole %.

3. The structure of claim 2 wherein the coefficient of thermal expansion over a temperature range from room temperature to 800° C. is about −0.5×$10^{-7}$/° C. to +6×$10^{-7}$/° C.

4. The structure of claim 3 wherein the porosity is about 40–50 percent by volume.

5. The structure of claim 4 wherein the median pore size is about 8–15 micrometers.

6. The structure of claim 1 wherein the ceramic consists essentially of about 70–80 percent by weight iron stabilized aluminum titanate and about 20–30 percent by weight strontium feldspar.

7. The structure of claim 6 wherein the coefficient of thermal expansion over a temperature range from room temperature to 800° C. is about −0.3×$10^{-7}$/° C. to +2×$10^{-7}$/° C.

8. The structure of claim 7 wherein the porosity is about 40–50 percent by volume.

9. The structure of claim 8 wherein the median pore size is about 8–15 micrometers.

10. The structure of claim 1 wherein the structure has a honeycomb shape having an inlet end, an outlet end, and a multiplicity of cells extending form the inlet end to the outlet end.

11. A diesel exhaust particulate filter comprising a plugged, wall-flow honeycomb filter body composed of porous ceramic material and comprising a plurality of parallel end-plugged cell channels traversing the body from a frontal inlet end to an outlet end thereof, wherein:

the ceramic consists essentially of 50–90 percent by weight aluminum titanate ($AlTiO_5$) and about 10–50 percent by weight strontium feldspar ($SrO.Al_2O_3.2SiO_2$), wherein the aluminum titanate is stabilized by iron (Fe) or magnesium (Mg), the substitution of iron or magnesium into the aluminum titanate phase being at 0–60 mole %.

12. The diesel exhaust particulate filter of claim 1 further characterized by a coefficient of thermal expansion over a temperature range from room temperature to 1000° C. of about −10×$10^{-7}$/° C. to +15×$10^{-7}$/° C., a heat capacity at 500° C. of greater than 3.2 J/cm$^3$K, a porosity of about 15–50 percent by volume, and a uniform pore size distribution with a median pore size of about 5–50 micrometers.

13. The structure of claim 12 wherein iron or magnesium is substituted into aluminum titanate in a range of about 1–10 mole %.

14. The diesel exhaust particulate filter of claim 13 wherein the coefficient of thermal expansion over a temperature range from room temperature to 800° C. is about −0.5×$10^{-7}$/° C. to +6×$10^{-7}$/° C.

15. The diesel exhaust particulate filter of claim 14 wherein ceramic the porosity is about 40–50 percent by volume.

16. The diesel exhaust particulate filter of claim 15 wherein the median pore size is about 8–15 micrometers.

17. The diesel exhaust particulate filter of claim 11 wherein the ceramic consists essentially of 70–80 percent by weight iron stabilized aluminum titanate and 20–30 percent by weight strontium feldspar.

18. The diesel exhaust particulate filter of claim 17 wherein the coefficient of thermal expansion over a temperature range from room temperature to 800° C. is about −0.3×$10^{-7}$/° C. to +2×$10^{-7}$/° C.

19. The diesel exhaust particulate filter of claim 18 wherein ceramic the porosity is about 40–50 percent by volume.

20. The diesel exhaust particulate filter of claim 19 wherein the median pore size is about 8–15 micrometers.

* * * * *

UNITED STATES PATENT AND TRADEMARK OFFICE
CERTIFICATE OF CORRECTION

PATENT NO.       : 6,620,751 B1
APPLICATION NO.  : 10/098711
DATED            : September 16, 2003
INVENTOR(S)      : Steven B. Ogunwumi It is certified that error appears in the above-identified patent and that said Letters Patent is hereby corrected as shown below:

In the Claims

| Col. | Line | Description |
|---|---|---|
| 7 | 19 claim 1 | "aluminum titanate ($AlTiO_5$)"—should read "aluminum titanate ($Al_2TiO_5$)" |
| 8 | 11 claim 11 | "weight aluminum titanate ($AlTiO_5$)"—should read "weight aluminum titanate ($Al_2TiO_5$)" |

Signed and Sealed this
Twenty-sixth Day of November, 2013

Margaret A. Focarino
*Commissioner for Patents of the United States Patent and Trademark Office*